United States Patent [19]

Holz

[11] Patent Number: 5,932,358

[45] Date of Patent: Aug. 3, 1999

[54] SURFACE COMPONENT

[75] Inventor: Rüdiger Holz, Wörthsee, Germany

[73] Assignee: Krauss-Maffei Verkehrstechnik GmbH, München, Germany

[21] Appl. No.: 08/809,847

[22] PCT Filed: Jul. 3, 1996

[86] PCT No.: PCT/EP96/02916

§ 371 Date: Apr. 1, 1997

§ 102(e) Date: Apr. 1, 1997

[87] PCT Pub. No.: WO97/05974

PCT Pub. Date: Feb. 20, 1997

[30] Foreign Application Priority Data

Aug. 4, 1995 [DE] Germany .......................... 195 28 610

[51] Int. Cl.[6] ...................................................... B32B 3/26
[52] U.S. Cl. ........................................... 428/594; 428/120
[58] Field of Search ..................................... 428/120, 598, 428/593, 594; 244/123, 119; 52/633

[56] References Cited

U.S. PATENT DOCUMENTS

| 2,960,197 | 11/1960 | Langhans | 428/120 |
| 3,639,106 | 2/1972 | Yate | 29/191 |
| 4,607,783 | 8/1986 | Mansbridge et al. | 428/593 |

FOREIGN PATENT DOCUMENTS

| 0 379 310 | 7/1990 | European Pat. Off. . |
| 2 348 007 | 11/1977 | France . |
| 330 9 736 | 9/1984 | Germany . |
| 43 02 875 | 2/1993 | Germany . |

*Primary Examiner*—Alexander Thomas
*Attorney, Agent, or Firm*—Henry M. Feiereisen

[57] ABSTRACT

A surface component comprised of sheet metal with stiffening sections which are bonded to the sheet metal by means of welds arranged in stretches. To avoid doubling the sheet metal in the region of the bonds between it and the sections and improve the adjustability of the sheet metal at the bonding points, there are cut-outs in the edge regions of the sections between the stretches.

3 Claims, 1 Drawing Sheet

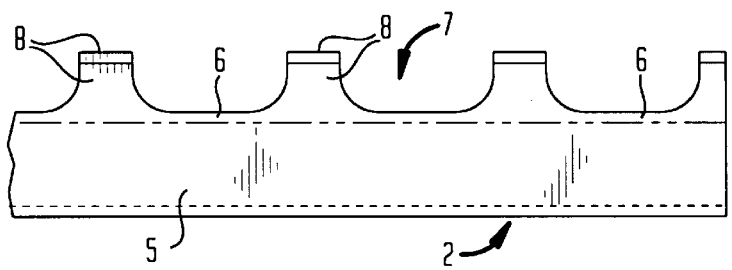
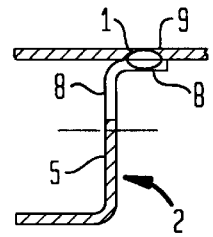
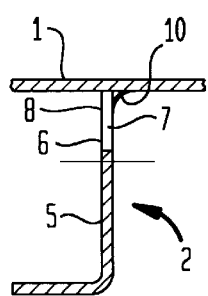
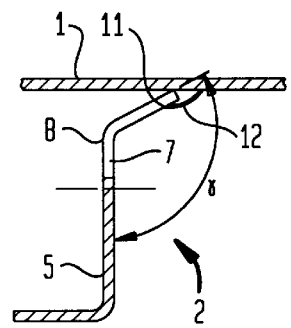
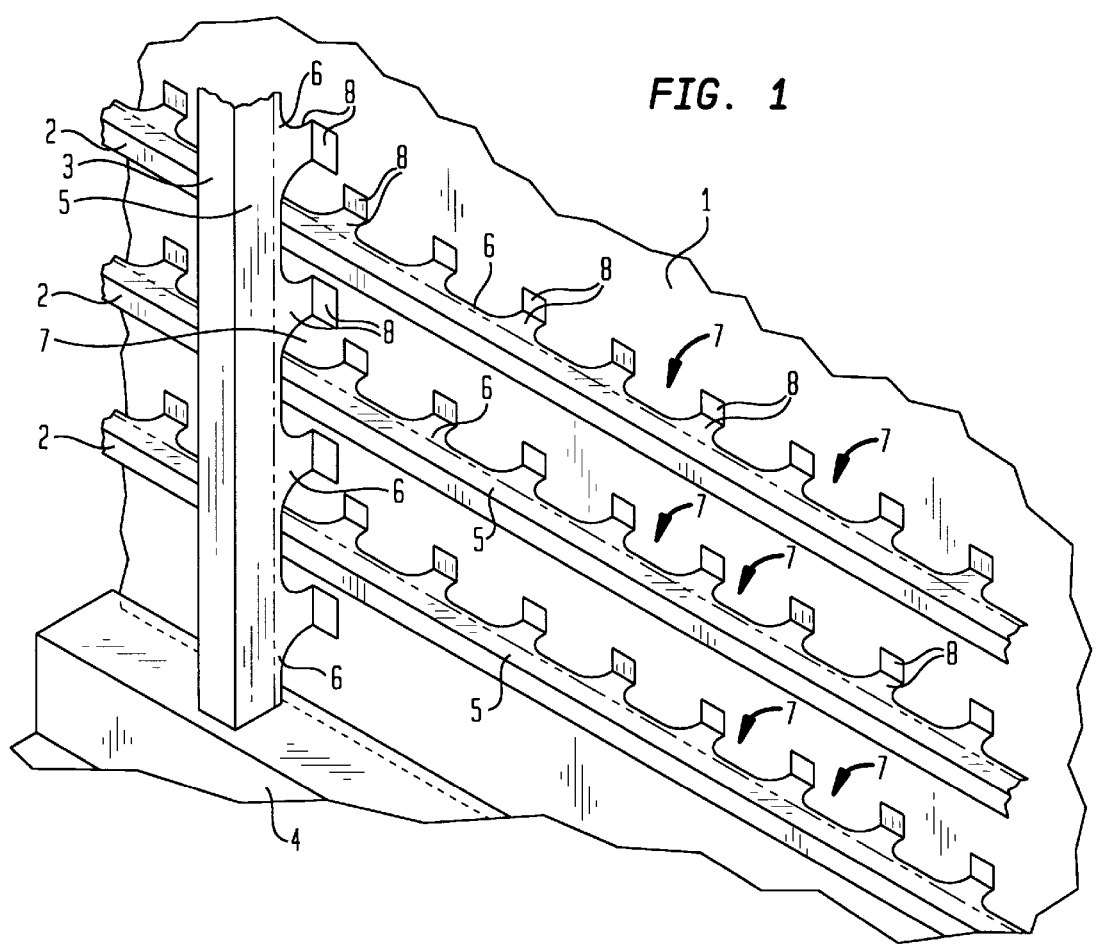

SURFACE COMPONENT

BACKGROUND OF THE INVENTION

The invention relates to a surface component in particular to a structural wall support of wagon boxes or rail vehicles. More particularly, the present invention refers to a surface component of a type having a sheet metal structure and sectional members for stiffening the sheet metal structure, with the sectional members including at least one profile web oriented perpendicular to the sheet metal structure, wherein profile legs abutting the sheet metal structure are welded to the sheet metal structure at spaced weld points.

It is known that surface components of this type can be constructed by welding sheet metal to the profile leg using discontinuous fillet welds in order to keep the sink marks of the weld seams which appear on the outside of the sheet metal, as small as possible. This has the disadvantage that over the entire length of the profile legs, the profile leg and the sheet metal form double walls which have to be well sealed with a sealing compound in order to prevent corrosion. The problem here is to ensure that all areas having double-wall metal parts are completely sealed. Another disadvantage lies in the considerable difficulty to shape the sheet metal accurately or sufficiently in the sections where the sheet metal has a continuous double wall and is partly provided with weld seams.

SUMMARY OF THE INVENTION

It is therefore an object of the invention, to improve a surface component of the aforedescribed type in such a way that sealing of the discontinuous weld seams can be eliminated entirely or almost entirely, and that the sheet metal can be much more easily straightened or adjusted in order to achieve an exact form fit.

This object is attained in accordance with the present invention by providing the sectional members at least at the profile legs with cut-outs at formation of segments therebetween, and by welding the segments to the sheet metal structure for attachment of the sectional members.

Although there are known profile sections with cut-outs disposed on the sheet metal, these cut-outs are only openings for intersecting profile sections. The invention, however, is based on the concept that as a result of the cut-outs provided in the profile legs which are not welded together, the sheet metal is no longer double-walled between the profile leg and the sheet metal and, on the other hand, the areas which include the profile legs located between the cut-out and welded to the sheet metal, can be aligned much more easily than if the profile legs were continuous. The sheet metal, however, may also be aligned from the inside through the cut-outs. The location of the sections of the weld seams is predetermined by the sections of the legs of the profile abutting the sheet metal, thereby eliminating the need to measure and mark the sections of the weld seams. The weld seams may be implemented in such a way that there is no longer a need for any sealing measures. Since the profiles are connected only in certain sections with the wide openings formed by the cut-outs in the profile sections, heat conduction through the profile sections to the inside is significantly reduced. The air used for heat insulation of the wall can circulate better in the profile sections due to the openings created by the cut-outs, preventing condensation. Since the profile sections are connected only in certain sections and because double-walls are avoided in areas where the profile sections are not welded, the sound transmission from the sheet metal via the profile sections to the inner wall covering is also significantly reduced.

According to a preferred embodiment, the profile sections are formed in such a way that the profile legs disposed between the profile webs oriented perpendicular to the sheet metal and the sheet metal itself form an angle with the perpendicular profile webs of greater than 90°. As a result of the angled arrangement, the profile legs can be easily bend from both the inside and the outside when the sheet metal requires adjustment.

Preferably, the leading edges of the profile legs are welded to the sheet metal by way of a fillet weld, which makes adjustments particularly easy and effective, thereby ensuring that the welding operation does not cause any enclosed hollow spaces or a double walls in the sheet metal.

BRIEF DESCRIPTION OF THE DRAWING

The invention is discussed in further detail hereinafter with reference to the appended drawing in which:

FIG. 1 shows a fragmentary schematic perspective illustration of a surface component with intersecting profile sections welded in sections on the inside of the sheet metal, FIG. 2 shows a fragmentary schematic illustration of a profile;

FIG. 3 is a cross sectional view of the profile of FIG. 2 with sheet metal structure;

FIG. 4 the cross-section of another embodiment of a profile section; and

FIG. 5 is a cross sectional view of another embodiment of a profile section.

DETAILED DESCRIPTION OF PREFERRED EMBODIMENTS

The surface component includes of a sheet metal structure 1 with horizontal profile sections 2 extending along the inside of the sheet metal and an intersecting vertical profile section 3 welded to the sheet metal structure 1. The sheet metal structure 1 and the profile section 3 are welded to an underframe 4 (not shown in detail) of the wagon box of a rail vehicle, for example a locomotive. The profile sections 2 and 3 have oriented perpendicular to the sheet metal structure 1 a profile web 5 which transitions into a profile leg 6, by which the profile sections 2 and 3 are welded to the sheet metal structure 1. In the drawing, the profile web 5 and the profile leg 6 are separated from each other by the dot-dashed line. The profile legs 6 are provided with cut-outs having sections 8 therebetween which are used for welding the profile sections 2 and 3 to the sheet metal structure 1. The cut-outs can extend into the region of the profile webs 5.

The profile section depicted in FIG. 2 and 3 illustrates that the remaining portion of the profile leg 6 consists essentially only of the sections 8. These sections 8 which are welded to the sheet metal structure 1 are providing sufficient stability to the sheet metal structure 1, while they are simultaneously easily deformable in contrast to profile sections which do not have cut-outs. Consequently, the sheet metal structure 1 can be adjusted easily from both sides.

From FIG. 3, it is evident from the way section 8 is connected to the sheet metal structure 1 via a spot weld 9, that double walls in sheet metal is almost entirely avoided.

In the profile section shown in FIG. 4, the profile web 5 and the profile leg 6 are arranged in a plane perpendicular to the sheet metal structure 1. The section 8 of the profile leg 6 is also perpendicular to the sheet metal structure 1 and connected thereto via a fillet weld 10.

In the profile section shown in FIG. 5, the profile web 5 and the profile leg 6 are oriented with respect to each other at an angle a which is greater than 90°. The angled construction provides good deformability for adjustment purposes, while, on the other hand, the leading edge 11 of the profile leg 6 can be welded to the sheet metal with a fillet weld 12, thereby completely preventing double-walled sheet metal and other enclosed hollow spaces.

What is claimed is:

1. A surface component, comprising:

a sheet metal structure; and a profile assembly for stiffening the sheet metal structure, said profile structure including a section member formed with a profile web oriented perpendicular to the sheet metal structure and terminating in a profile leg abutting the sheet metal structure and formed with cut-outs at formation of intermediate sections which are welded to the sheet metal structure for attachment of the section member, said profile leg extending with respect to the profile web at an angle which is greater than 90°.

2. The surface component of claim 1 wherein the sections has end edges which are welded to the sheet metal structure by means of a fillet weld.

3. The surface component of claim 1 wherein the profile assembly has first section members extending horizontally along the sheet metal structure and second section members extending vertically to the first section members.

* * * * *